US012761711B2

(12) United States Patent
Sultenfuss et al.

(10) Patent No.: US 12,761,711 B2
(45) Date of Patent: Oct. 13, 2026

(54) UNIVERSAL SERIAL BUS TYPE C CABLE PERFORMANCE

(71) Applicant: DELL PRODUCTS L.P., Round Rock, TX (US)

(72) Inventors: Andrew T. Sultenfuss, Leander, TX (US); Chi Che Wu, Taipei (TW); Wei-Cheng Yu, New Taipei City (TW)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 18/790,610

(22) Filed: Jul. 31, 2024

(65) Prior Publication Data

US 2026/0037046 A1 Feb. 5, 2026

(51) Int. Cl.

*G06F 1/26* (2006.01)
*G06F 1/3206* (2019.01)
*G06F 13/38* (2006.01)

(52) U.S. Cl.

CPC ............ *G06F 1/266* (2013.01); *G06F 1/3206* (2013.01); *G06F 13/385* (2013.01); *G06F 2213/0042* (2013.01)

(58) Field of Classification Search

CPC ....... G06F 1/266; G06F 1/3206; G06F 13/385
USPC ........................................................ 713/300
See application file for complete search history.

(56) References Cited

U.S. PATENT DOCUMENTS

| | | | | |
|---|---|---|---|---|
| 3,449,634 A * | 6/1969 | Hung | H02H 9/041 | 361/56 |
| 4,410,925 A * | 10/1983 | Tucker | H02H 3/17 | 361/49 |
| 4,611,289 A * | 9/1986 | Coppola | G06F 1/00 | 713/340 |
| 5,812,905 A * | 9/1998 | Yoo | G03G 15/0266 | 399/176 |
| 6,343,498 B1 * | 2/2002 | Oba | G01D 3/08 | 73/1.57 |
| 2006/0015670 A1 * | 1/2006 | Cinkler | G06F 13/4081 | 710/302 |
| 2006/0190747 A1 * | 8/2006 | Fukumori | G11B 19/08 | 713/300 |
| 2014/0125131 A1 * | 5/2014 | Lalitnuntikul | G06F 1/266 | 307/31 |
| 2014/0156879 A1 * | 6/2014 | Wong | G06F 11/3055 | 710/19 |
| 2016/0174316 A1 * | 6/2016 | Hori | H05B 45/24 | 315/186 |
| 2018/0192485 A1 * | 7/2018 | Beij | H05B 47/185 | |
| 2019/0044322 A1 | 2/2019 | Hijazi et al. | | |
| 2019/0341709 A1 * | 11/2019 | Shofner, II | H01R 11/30 | |
| 2020/0004308 A1 * | 1/2020 | Moritomo | G06F 1/28 | |

(Continued)

*Primary Examiner* — Paul R. Myers
(74) *Attorney, Agent, or Firm* — Larson Newman, LLP

(57) ABSTRACT

A power adapter device including a power supply and a power delivery integrated circuit (PD IC). The power supply provides a current to an output terminal of the power adapter device. The PD IC initiates a first voltage across a first resistor of a first information handling system. The PD IC monitors a second voltage at a voltage pin of a power cable. The power cable is connected between the power adapter device and the first information handling system. The PD IC compares the second voltage at the voltage pin to a threshold voltage level. In response to the second voltage being greater than the threshold voltage level, the PD IC performs a power adapter fault operation.

20 Claims, 4 Drawing Sheets

(56) References Cited

U.S. PATENT DOCUMENTS

| | | | | |
|---|---|---|---|---|
| 2020/0303935 | A1* | 9/2020 | Sorias | H02J 7/82 |
| 2022/0224128 | A1* | 7/2022 | Lim | H01M 10/486 |
| 2023/0128943 | A1 | 4/2023 | Yu et al. | |
| 2023/0187922 | A1* | 6/2023 | Randazzo | H02H 5/048<br>361/87 |
| 2025/0004070 | A1* | 1/2025 | King | G01R 31/67 |

* cited by examiner

UNIVERSAL SERIAL BUS TYPE C CABLE PERFORMANCE

FIELD OF THE DISCLOSURE

The present disclosure generally relates to information handling systems, and more particularly relates to determining universal serial bus type C cable performance via voltage line analysis.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A power adapter includes a power supply and a power delivery integrated circuit (PD IC). The power supply may provide a current to an output terminal of the power adapter. The PD IC may initiate a first voltage across a first resistor of a first information handling system. The PD IC may monitor a second voltage at a voltage pin of a power cable. The power cable is connected between the power adapter device and the first information handling system. The PD IC may compare the second voltage at the voltage pin to a threshold voltage level. If the second voltage is greater than the threshold voltage level, then the PD IC may perform a power adapter fault operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
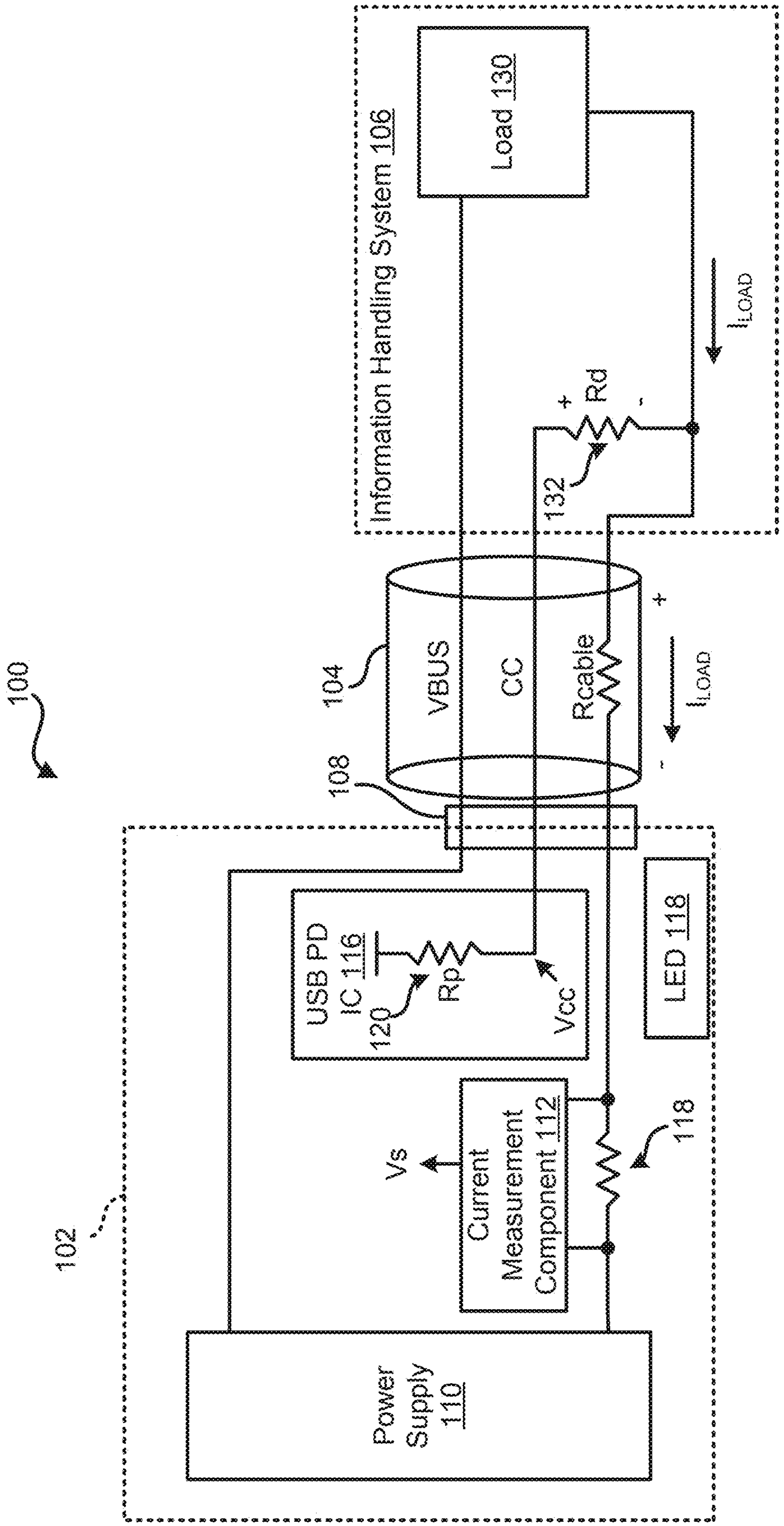
FIG. 1 is a diagram of a portion of a system including a power adaptor and an information handling system, according to at least one embodiment of the present disclosure.

FIG. 1 illustrates a system 100 including a power adapter 102, a power cable 104, and an information handling system 106 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Power adapter 102 includes a (USB) type C (USB-C) interface 108, a power supply 110, a current measurement component 112, and a USB power delivery integrated circuit (PD IC) 116 and resistors 118 and 120. Power cable 104 includes a voltage bus, VBUS, a CC line, and a particular resistance, Rcable. Information handling system 106 includes a load 130 and a resistor 132. Power adaptor 102, cable 104, and information handling system 106 may include additional components without varying from the scope of this disclosure. For example, power adaptor 102 may include a bridge rectifier, a boost converter, a direct current (DC)/DC topology circuit, a main transformer, an output filter, a feedback regulator, an opto-coupler, an IC that includes a combination of power factor correction (PFC) and pulse width modulation (PWM) circuitry. In an example, system 100 may include additional components without varying from the scope of this disclosure.

In an example, power adapter 102 may plug into an alternating current (AC) outlet and provide a DC output. For example, power supply 110 may receive the AC current/voltage from the outlet and covert the AC current/voltage to a DC current/voltage by any operations know in the art and output the DC current/voltage from the power adapter via the USB-C interface 108. Power adapter 102 and power cable 104 may both include USB-C connectors. In certain examples, power cable 104 may be permanently attached to power adapter 102 or may be detachable from the power adapter. In certain situations where power cable 104 is detachable from power adapter 102, the manufacturer of the power adapter may not be the same as the manufacturer of the power cable. In these situations, power cable 102 may be damaged, marginal, extra-long, include extenders, or be sub-standard, and these conditions of the power cable may create power deliver issues between power adapter 102 and information handling system 106.

In certain examples, power cable 104 may indicate that it is a USB-C cable but the power cable may lack USB PD IC requirements that may be included in power adapter 102. Further, some power cables may have poor plating and cable design, which may damage side sockets of information handling system 106 when operated with marginal cables. These and other issues may cause disconnections issues between power adapter 102 and information handling system 106 or 108. In an example, the disconnection may be caused by a voltage drop at the system side when information handling system 106 is pulling power from the adapter and the voltage level drops below system PD UVP protection level. This condition may result in information handling system 106 non-charging and battery discharge. Power adapter 102 and charging of information handling system 106 may be improved by components within power adapter 102 detecting/determining connections between the power adapter and information handling system 106.

In an example, power adapter device 102 may be powered on, which in turn may cause power supply 110 to output a direct current (DC) current toward USB interface 108. Power adapter device 102 may be powered on in any suitable manner including, but not limited to, the power adapter device being plugged into an AC power socket and a power button on the power adapter device being pressed. After power adapter device 102 has been powered on, USB PD IC 116 may determine whether USB-C connector power cable 104 is connected to the power adapter device. In an example, USB-C connector power cable 104 may be connected to power adapter device 102 in any suitable manner, such as the connector power cable being plugged into USB-C interface 108 of the power adapter device, a portion of the power adapter device being plugged into the connector power cable, or the like.

Based on USB PD IC 116 detecting power cable 104 being plugged into USB-C interface 108 of power adapter 102, the USB PD IC may set a power supply ready indicator within the power adapter device. Based on power cable 104 being plugged into USB-C interface 108 and power adapter 102 being plugged into an AC power outlet, the DC current from power supply 110 is provided along VBUS of power cable 104 to information handling system 106. The DC current is provided through load 130 and along a return path back through a line of power cable 104. In an example, CC line of power cable 104 may be coupled between a VCC pin in USB PD IC 116 and a first terminal of resistor 132 of information handling system 106.

Based on the connection between resistor 120 and resistor 132 through CC line, the DC current from load 130 may activate or initiate resistor 132. In an example, resistor 132 may be any suitable resistor in information handling system 106. In certain examples, resistor 132 may be one of multiple resistances along a current path from USB-C interface 108 of power adapter device 102, connector power cable 104, information handling system 106, and back through the connector power cable to the USB-C interface of the power adapter device. For example, VBUS in power cable 104 has a specific resistance or impedance, load 130 has a resistance or impedance, and the return line has a resistance or impedance, Rcable.

In an example, USB PD IC 116 may monitor the voltage at a CC pin. In certain examples, the CC pin or line may be defined by USB-C. In an example, a determination is made whether a resistance value is greater than a threshold value. In certain examples, the monitored resistance value of load 130 may be a combination of the resistance of the VBUS in power cable 104, load 130, resistance, Rcable, of the return line, or the like. This determination may be made in any suitable manner such as current measurement component 112 monitoring a load current through resistor 118, USB PD IC 116 monitoring the voltage at the CC pin, or the like.

In certain examples, load 130 in information handling system 106 may be dynamic. In an example, the CC line voltage in power cable 104 may be directly influenced by load 130 of information handling system 106. As load 130 increases, the CC line voltage also increases. Based on USB PD IC 116 monitoring the voltage levels on the CC line of cable 104, the USB PD IC may determine a status of the cable. The status of power cable 104 may be a good/healthy cable, a bad cable, or the like. In an example, USB PD IC 116 may detect both high and low voltage levels to identify any abnormalities in cable 104.

In an example, USB PD IC 116 may also identify whether power cable 104 is a wrong cable for power adapter 102. In certain examples, wrong power cables may have high DC resistance (DCR) values, which can lead to various problems in power adapter 102 and information handling system 106 or 108. In an example, USB PD IC 116 may utilize an operation amplifier (OP) comparator to identify wrong DC cables. In this example, the OP comparator in USB PD IC 116 may monitor the voltage on the CC pin and compares this voltage to a predetermined level. If the voltage exceeds the set level, USB PD IC 116 may determine that a wrong cable, such as a high DCR value cable, is connected to power adapter 102. In an example, the predetermined voltage level may be stored in a memory of USB PD IC 116.

In certain examples, USB PD IC 116 may include a DC cable detection circuit to determine a real-time power state of power cable 104. Power adapter 102 may include a DC cable power resistance circuit, which in turn may enhance PD power profiles of the power adapter. In an example, the cable power resistance circuit, such as USB PD IC 116, may monitor adapter/device power levels to reflect valid power profiles. These power levels may be reflective of each of the target voltages when multiple options may be needed. If the power transmission is outside of parameters of power adapter 102, USB PD IC 116 may engage the protection latch-off mode of fault to protect the power adapter, and information handling system 106. In an example, the detected error, such as incorrect power levels, may be stored within a memory of USB PD IC 116. These errors may be reset when power adapter 102 is no longer connected to an AC power source.

In an example, circuitry in power adapter 102 may perform one or more operations to determine a real-time resistance of power cable 104. This real-time resistance may be utilized to determine the performance or health of cable 104. The real-time resistance may be determined by USB PD IC 116 or current measurement component 112 as described above. In an example, as the resistance of power cable 104 increases, the voltage at the CC pin may also increase. Thus, if USB PD IC 116 detects that the voltage at the CC pin of power cable 104 is greater than the threshold voltage, the real-time resistance value is determined to be greater than the threshold value. If the resistance value is greater than the threshold value, USB PD IC 116 may determine a latch fault. In certain examples, USB PD IC 116 and a PWM IC in power adapter 102 may trigger a protection mode and shut down the power adapter if necessary. This integration ensures the safety of information handling system 106 or 108 by preventing any potential damage caused by a faulty cable 104. In an example, coordinated action of these components may enhance the overall reliability and performance of USB-C power adapters.

In certain examples, USB PD IC 116 may alert a user of information handling system 106 of the fault condition while power adapter 102 is plugged into the information handling system. In an example, this alert may be provided in any suitable manner. For example, an alert message may be provided on a display device of information handling system 106, LED 118 may be activated, or the like. If the alert message is provided on a display device, the message may be on a graphical user interface (GUI) and the message may include information associated with the fault condition. In an example, LED 118 may provide the fault indication in any suitable manner, such as the LED being illuminated a particular color, the LED being illuminated in a particular pattern or sequence, or the like.

In some circumstances, the latch fault may be caused by load 130 and not power cable 104. In an example, power adapter 102 components within power adapter 102 may perform one or more operations to determine whether power cable 104 is faulty as will be described with respective to FIG. 2 below.

Figure 2:
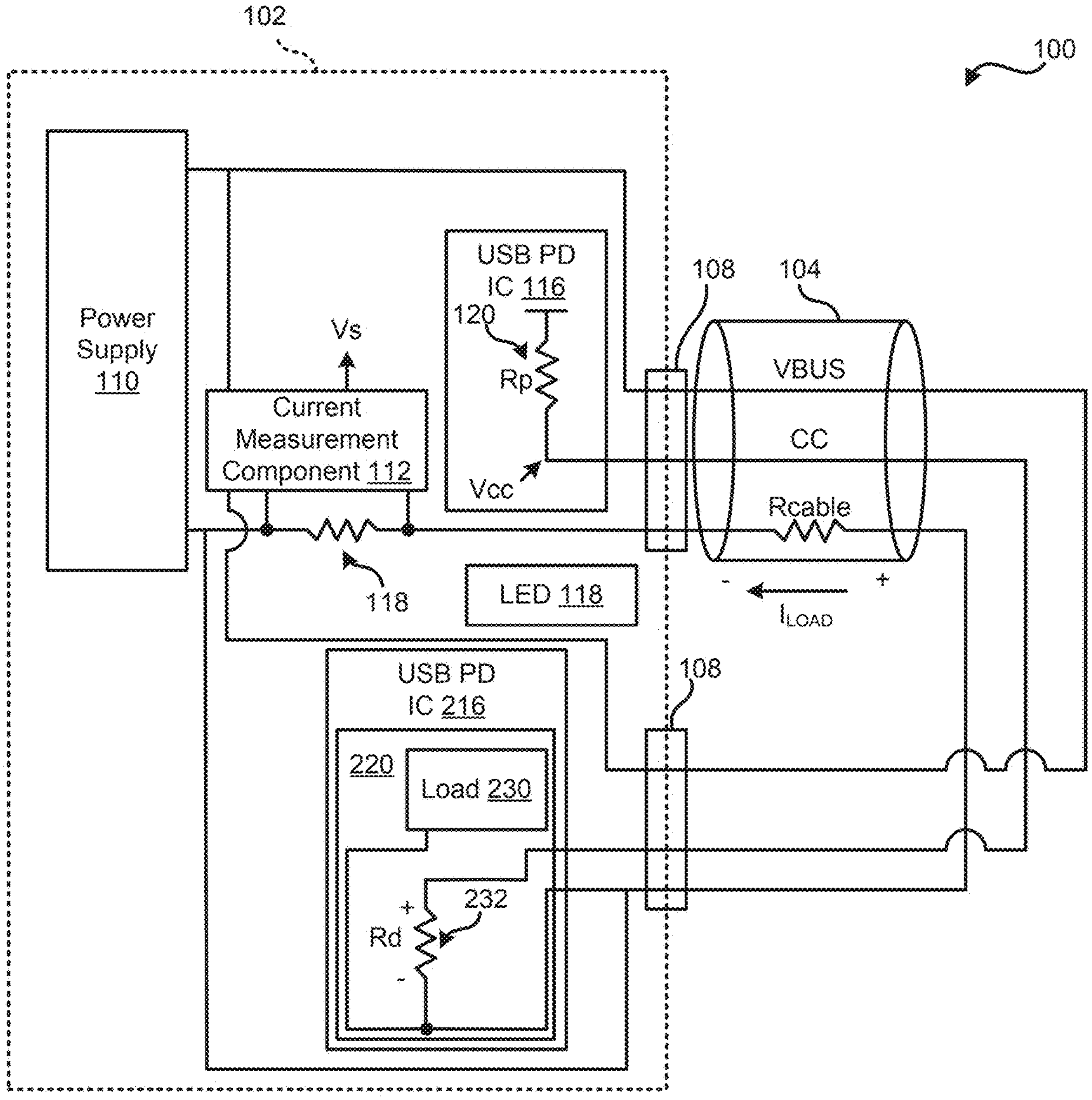
FIG. 2 is a diagram of a portion of a system including a power adaptor and an information handling system, according to at least one embodiment of the present disclosure.

FIG. 2 illustrates system 100 including power adapter 102 and power cable 104 according to at least one embodiment of the present disclosure. Power adapter 102 includes a USB-C interface 208, a USB PD IC 216, USB-C interface 108, power supply 110, current measurement component 112, USB PD IC 116 and resistors 118 and 120. Power cable 104 includes voltage bus, VBUS, CC line, and a particular resistance, Rcable. USB PD IC 216 a DC cable detection circuit 220, which in turn includes a load 230 and a resistor 232. In an example, cable detection circuit 220 to determine a real-time power state of power cable 104. Power adaptor 102 and cable 104 may include additional components without varying from the scope of this disclosure. For example, power adaptor 102 may include a bridge rectifier, a boost converter, a DC/DC topology circuit, a main transformer, an output filter, a feedback regulator, an optocoupler, an IC that includes a combination of PFC and PWM circuitry. In an example, system 100 may include additional components without varying from the scope of this disclosure.

In an example, power adapter 102 may be a dual USB-C power adapter, such that the power adapter includes two USB-C interfaces 108 and 208. In this example, a user may plug power cable into both USB-C interfaces 108 and 208. In response to power cable 104 being plugged into both USB-C interface 108 and USB-C interface 208, USB PD ICs 116 and 216 may communicate with each other to establish a USB-C connection between the PD ICs via power cable 104. Based on power adapter 102 being plugged into an AC outlet, power supply 110 may provide a DC voltage on VBUS of power cable 104 through USB-C interface 108. The DC current is provided through load 230 out of USB-C interface 208 and along a return path back through a line of power cable 104. In an example, CC line of power cable 104 may be coupled between a VCC pin in USB PD IC 116 and a first terminal of resistor 232 of USB PD IC 216.

Based on the connection between resistor 120 and resistor 232 through CC line, the DC current from load 230 may activate or initiate resistor 232. In an example, resistor 232 may be any suitable resistor in USB PC IC 216. In certain examples, VBUS in power cable 104 has a specific resistance or impedance, load 230 has a resistance or impedance, and the return line has a resistance or impedance, Rcable.

In an example, USB PD IC 116 may monitor the voltage at a CC pin. In certain examples, the CC pin or line may be defined by USB-C. In an example, a determination is made whether a resistance value is greater than a threshold value. In certain examples, the monitored resistance value of load 230 may be a combination of the resistance of the VBUS in power cable 104, load 230, resistance, Rcable, of the return line, or the like. This determination may be made in any suitable manner such as current measurement component 112 monitoring a load current through resistor 118, USB PD IC 116 monitoring the voltage at the CC pin, or the like.

In an example, the CC line voltage in power cable 104 may be directly influenced by load 230 of and the resistances within power cable 104. As load 230 and/or resistance in power cable 104 increases, the CC line voltage also increases. Based on USB PD IC 116 monitoring the voltage levels on the CC line of cable 104, the USB PD IC may determine a status of the cable. The status of power cable 104 may be a good/healthy cable, a bad cable, or the like. In an example, USB PD IC 116 may detect both high and low voltage levels to identify any abnormalities in cable 104.

In certain examples, USB PD IC 116 may include a DC cable detection circuit to determine a real-time power state of power cable 104. Power adapter 102 may include a DC cable power resistance circuit, which in turn may enhance PD power profiles of the power adapter. In an example, the cable power resistance circuit, such as USB PD IC 116, may monitor adapter/device power levels to reflect valid power profiles. These power levels may be reflective of each of the target voltages when multiple options may be needed. If the power transmission is outside of parameters of power adapter 102, USB PD IC 116 may engage the protection latch-off mode of fault to protect the power adapter, and information handling system 106. In an example, the detected error, such as incorrect power levels, may be stored within a memory of USB PD IC 116. These errors may be reset when power adapter 102 is no longer connected to an AC power source.

In an example, circuitry in power adapter 102 may perform one or more operations to determine a real-time resistance of power cable 104. This real-time resistance may be utilized to determine the performance or health of cable 104. The real-time resistance may be determined by USB PD IC 116 or current measurement component 112 as described above. In an example, as the resistance of power cable 104 increases, the voltage at the CC pin may also increase. Thus, if USB PD IC 116 detects that the voltage at the CC pin of power cable 104 is greater than the threshold voltage, the real-time resistance value is determined to be greater than the threshold value. If the resistance value is greater than the threshold value, USB PD IC 116 may determine a latch fault.

In certain examples, USB PD IC 116 may alert a user of the fault condition while power adapter 102. In an example, this alert may be provided in any suitable manner. For example, LED 118 may be activated or the like. LED 118 may provide the fault indication in any suitable manner, such as the LED being illuminated a particular color, the LED being illuminated in a particular pattern or sequence, or the like.

In an example, if USB PD IC 116 does not detect a latch fault when power cable 104 is plugged into both USB-C interface 108 and USB-C interface 208, LED 118 may provide an indication that power cable 104 is in a good condition. For example, if USB PD IC 116 determines that power cable 104 is in a good condition, LED 118 may remain off, LED 118 may be illuminated a particular color such as green, or the like. In certain examples, if LED 118 does not provide a fault condition indication, the user of information handling system may determine that load 130 of information handling system 100 in FIG. 1 is the cause of the fault condition. In an example, USB PD IC 116 may store whether or not power cable 104 was in a fault condition while being plugged into both USB-C interface 108 and USB-C interface 208. USB PD IC 116 may provide this indication to information handling system 106 via power cable 104 the next time power adapter 102 is connected to information handling system 106 of FIG. 1. In this example, information associated with the testing may be provided on a GUI of a display devices of information handling system 104. This information may identify whether power cable 104 creates the fault condition or whether information handling system 106 is creating the fault condition.

Figure 3:
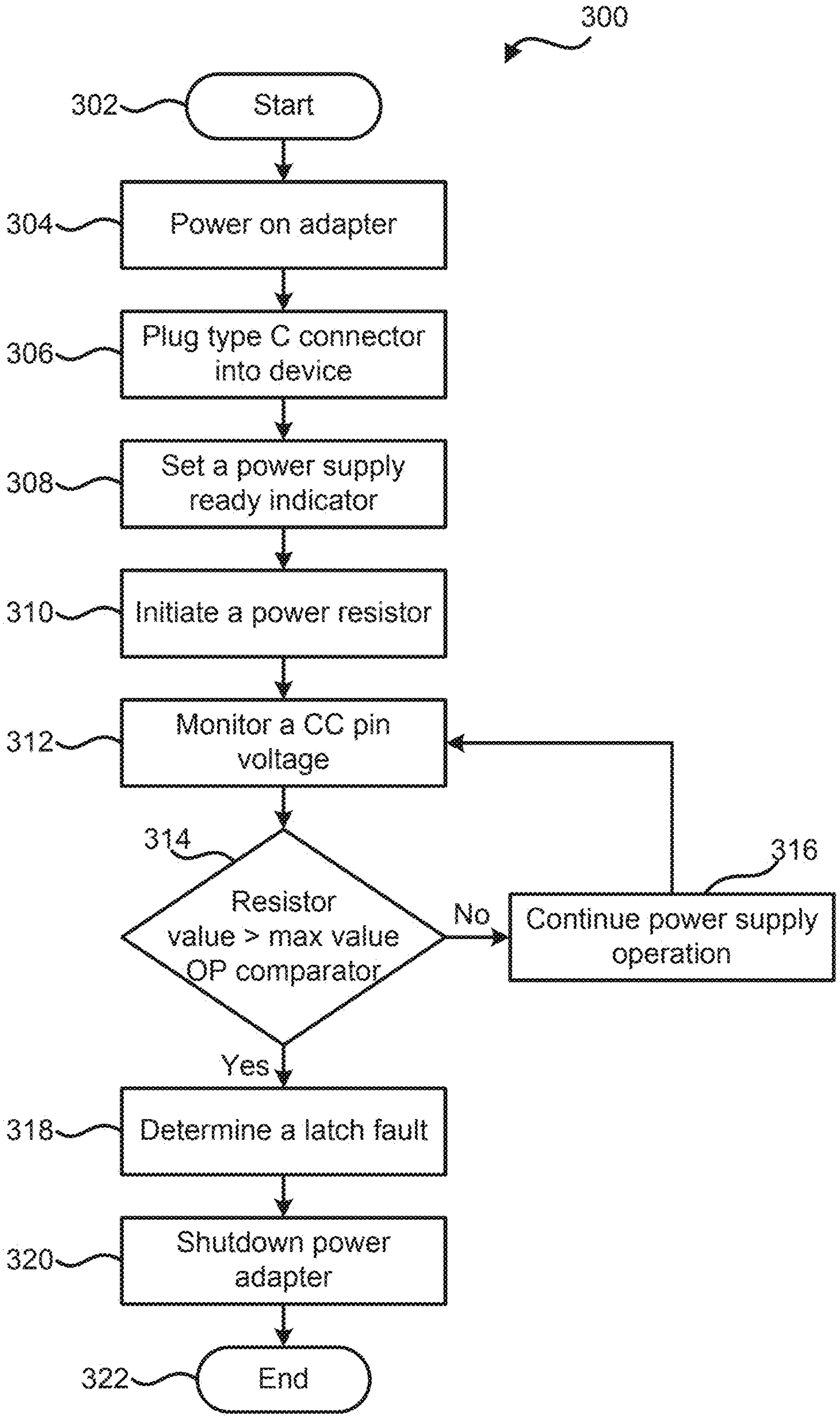
FIG. 3 is a flow diagram of a method for determining universal serial bus type C cable performance via voltage line analysis according to at least one embodiment of the present disclosure.

FIG. 3 is a flow diagram of a method 300 for determining USB-C cable performance via voltage line analysis according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, PD IC 116 of system 100 in FIG. 1, or any other type of controller, device, module, processor, or any combination thereof, operable to employ all, or portions of, the method of FIG. 3.

At block 304, a power adapter device is powered on. The power adapter device may be powered on in any suitable manner including, but not limited to, the power adapter device being plugged into an AC power socket and a power button being pressed. At block 306, a USB-C connector power cable is connected to the power adapter device. In an example, the USB-C connector power cable may be connected to the power adapter device in any suitable manner, such as the connector power cable being plugged into the power adapter device, a portion of the power adapter device being plugged into the connector power cable, or the like.

At block 308, a power supply ready indicator is set. At block 310, a power resistor is initiated. In an example, the power resistor may be any suitable resistor in an information handling system coupled to the power adapter through the USB-C connector power cable. In certain examples, the power resistor may be one of multiple resistances along a current path from the power adapter device, the connector power cable, the information handling system, and back through the connector power cable to the power adapter device.

At block 312, a voltage at a CC pin is monitored. In an example, the CC pin may be located within USB-C connector power cable. In certain examples, the CC pin or line may be defined by USB-C. At block 314, a determination is made whether a resistance value is greater than a threshold value. In certain examples, this determination may be made in any suitable manner such as monitoring a load current through the power adapter device, monitoring a voltage at the CC pin, or the like.

If the resistance value is not greater than the threshold value, the power supply operation is continued at block 316 and the flow continues as stated above at block 312. In certain examples, as the resistance increases, the voltage at the CC pin may also increase. Thus, if the voltage at the CC pin of the power cable is not greater than a threshold voltage, the resistance value is determined not to be greater than the threshold value.

If the resistance value is greater than the threshold value, a latch fault is determined at block 318. As stated above, as the resistance increases, the voltage at the CC pin may also increase. Thus, if the voltage at the CC pin of the power cable is greater than the threshold voltage, the resistance value is determined to be greater than the threshold value. At block 320, a power adapter fault operation is performed and the flow ends at block 322. In certain examples, the power adapter fault operation may be any suitable operation including, but not limited to, the power adapter device being shutdown, a LED in the power adapter device being lit, and a fault condition being provided to an information handling system connected to the power adapter device.

Figure 4:
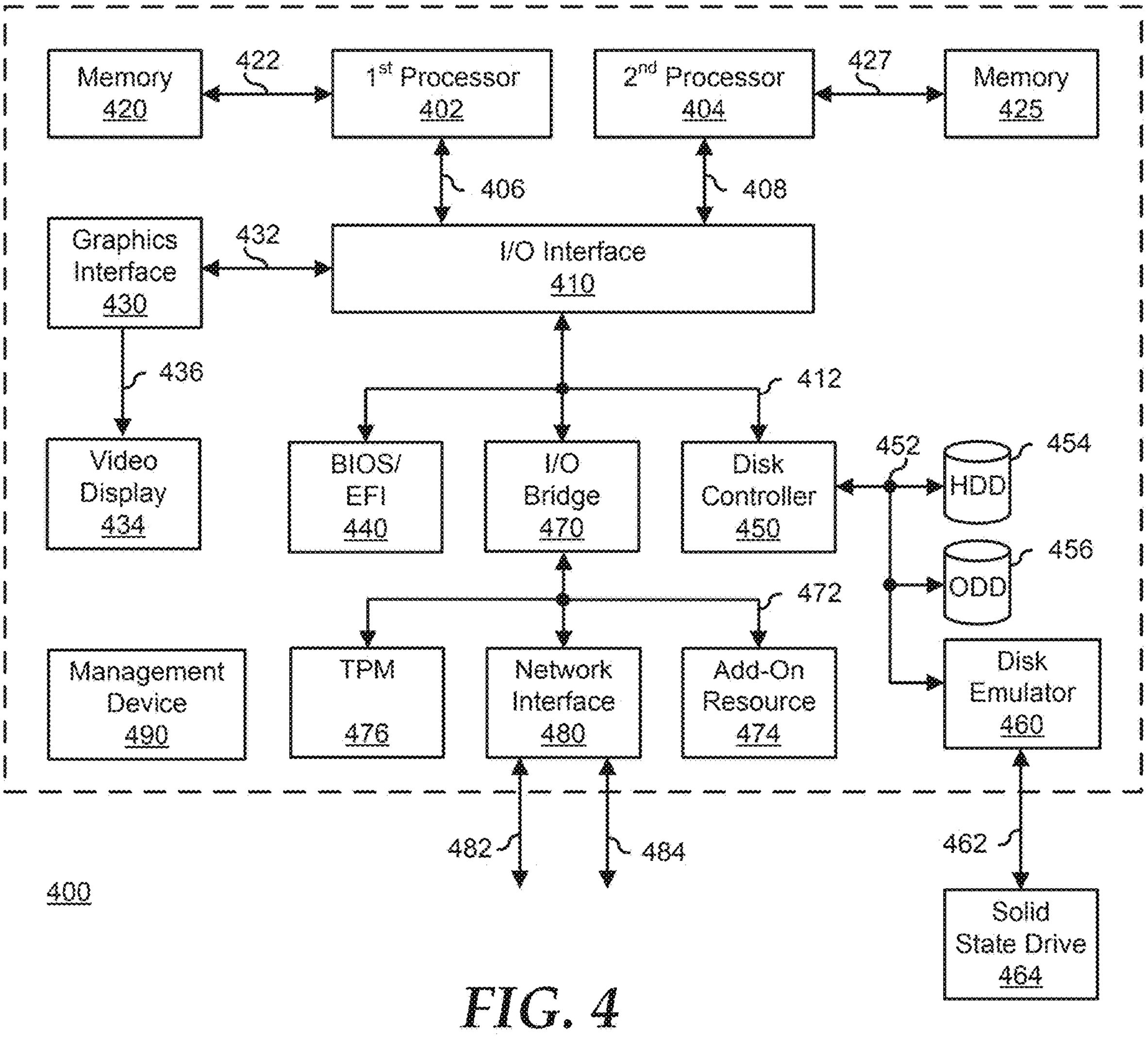
FIG. 4 is a block diagram of a general information handling system according to an embodiment of the present disclosure.

FIG. 4 shows a generalized embodiment of an information handling system 400 according to an embodiment of the present disclosure. Information handling system 400 may be substantially similar to information handling system 106 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 464, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 464, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (IDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power adapter device comprising:

a power supply to provide a current to an output terminal of the power adapter device; and a power delivery integrated circuit (PD IC) coupled to the power supply, the PD IC to:

initiate a first voltage across a first resistor within a first information handling system;

monitor a second voltage at a voltage pin of a power cable, wherein the power cable is connected between the power adapter device and the first information handling system, wherein the voltage pin is connected to a first terminal of the first resistor through a Vcc line of the power cable;

compare the second voltage at the voltage pin to a threshold voltage level; and in response to the second voltage being greater than the threshold voltage level, perform a power adapter device fault operation.

2. The power adapter device of claim 1, wherein the power adapter device fault operation includes the PD IC to perform a shutdown of the power adapter device.

3. The power adapter device of claim 1, wherein the power adapter device fault operation includes the PD IC to turn on a light emitting diode of the power adapter device.

4. The power adapter device of claim 1, wherein the second voltage increases based on an increase in a resistance along a path of the power cable and the first information handling system.

5. The power adapter device of claim 4, wherein the increase in the resistance is caused by a small break in the power cable.

6. The power adapter device of claim 1, wherein in response to the second voltage being greater than the threshold voltage level, the PD IC further to: save a power adapter fault condition associated with the first information handling system.

7. The power adapter device of claim 1, wherein the PD IC further to:

detect that the power cable is plugged into first and second interfaces of the power adapter device;

in response to the power cable being plugged into the first and second interfaces, initiate a third voltage across a second resistor of a second PD IC;

monitor a fourth voltage at the voltage pin of the power cable;

compare the third voltage at the voltage pin to the threshold voltage level;

in response to the third voltage not being greater than the threshold voltage level, determine that the power cable is in a good condition; and store the good condition of the power cable.

8. The power adapter device of claim 7, wherein the PD IC further to turn on a light emitting diode of the power adapter device a particular color to indicate that the power cable is in the good condition.

9. A method comprising:

initiating a voltage across a resistor within an information handling system;

monitoring, by a power delivery integrated circuit (PD IC) of a power adapter device, a first voltage at a voltage pin of a power cable, wherein the power cable is connected between the power adapter device and the information handling system, wherein the voltage pin is connected to a first terminal of the first resistor through a Vcc line of the power cable;

comparing, by the PD IC, the first voltage at the voltage pin to a threshold voltage level; and in response to the first voltage being greater than the threshold voltage level, performing a power adapter device fault operation.

10. The method of claim 9, wherein the power adapter device fault operation includes performing a shutdown of the power adapter device.

11. The method of claim 9, wherein the power adapter device fault operation includes turning on a light emitting diode of the power adapter device.

12. The method of claim 9, wherein the first voltage increases based on an increase in a resistance along a path of the power cable and the information handling system.

13. The method of claim 12, wherein the increase in the resistance is caused by a small break in the power cable.

14. The method of claim 9, wherein in response to the first voltage being greater than the threshold voltage level, the method further comprises: saving a power adapter fault condition associated with the information handling system.

15. The method of claim 9, further comprising:

detecting that the power cable is plugged into first and second interfaces of the power adapter device;

initiating a third voltage across a second resistor of a second PD IC;

monitoring a fourth voltage at the voltage pin of the power cable, wherein the power cable is connected between the power adapter device and the second information handling system;

comparing the third voltage at the voltage pin to the threshold voltage level;

in response to the third voltage not being greater than the threshold voltage level, determining that the power cable is in a good condition; and storing the good condition of the power cable.

16. The method of claim 15, wherein the method further comprises: turning on a light emitting diode of the power adapter device a particular color to indicate that the power cable is in the good condition.

17. A power adapter device comprising:

a power supply to provide a current to an output terminal within the power adapter device; and a power delivery integrated circuit (PD IC) coupled to the power supply, the PD IC to:

initiate a first voltage across a first resistor of a first information handling system;

monitor a second voltage at a voltage pin of a power cable, wherein the power cable is connected between the power adapter device and the first information handling system, wherein the voltage pin is connected to a first terminal of the first resistor through a Vcc line of the power cable;

compare the second voltage at the voltage pin to a threshold voltage level;

if the second voltage is greater than the threshold voltage level, then perform a power adapter device fault operation, wherein the power adapter device fault operation includes the PD IC to turn on a light emitting diode of the power adapter device; and if the second voltage is greater than the threshold voltage level, then save a power adapter fault condition associated with the first information handling system.

18. The power adapter device of claim 17, wherein the second voltage increases based on an increase in a resistance along a path of the power cable and the first information handling system.

19. The power adapter device of claim 17, wherein the PD IC further to:

detect that the power cable is plugged into first and second interfaces of the power adapter device;

in response to the power cable being plugged into the first and second interfaces, initiate a third voltage across a second resistor of a second PD IC;

monitor a fourth voltage at the voltage pin of the power cable;

compare the third voltage at the voltage pin to the threshold voltage level;

in response to the third voltage not being greater than the threshold voltage level, determine that the power cable is in a good condition; and store the good condition of the power cable.

20. The power adapter device of claim 19, wherein the PD IC further to turn on the light emitting diode of the power adapter device a particular color to indicate that the power cable is in the good condition.

* * * * *